US012736762B2

(12) United States Patent
Chiu et al.

(10) Patent No.: US 12,736,762 B2
(45) Date of Patent: Sep. 15, 2026

(54) UNDERCUT ARCHITECTURES FOR IMPROVED THERMAL EFFICIENCY IN PHOTONIC INTEGRATED CIRCUIT (PIC) ARCHITECTURES

(71) Applicant: Altera Corporation, San Jose, CA (US)

(72) Inventors: Chia-Pin Chiu, Tempe, AZ (US); Kaveh Hosseini, Livermore, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/189,911

(22) Filed: Mar. 24, 2023

(65) Prior Publication Data

US 2024/0319457 A1 Sep. 26, 2024

(51) Int. Cl.
*G02B 6/42* (2006.01)

(52) U.S. Cl.
CPC ......... *G02B 6/4273* (2013.01); *G02B 6/4238* (2013.01); *G02B 6/4274* (2013.01)

(58) Field of Classification Search
CPC ... G02B 6/4273; G02B 6/4238; G02B 6/4274
See application file for complete search history.

(56) References Cited

U.S. PATENT DOCUMENTS

2009/0274418 A1* 11/2009 Holzwarth ............. B82Y 20/00 385/30
2018/0074263 A1* 3/2018 Hickey ................... G02F 1/011

OTHER PUBLICATIONS

Timurdogan, Erman et al.; Vertical Junction Silicon Microdisk Modulator with Integrated Thermal Tuner; (2013); Technical Digest; pp. 2.

* cited by examiner

*Primary Examiner* — Uyen Chau N Le
*Assistant Examiner* — Hoang Q Tran
(74) *Attorney, Agent, or Firm* — Nicholson De Vos Webster & Elliott LLP

(57) ABSTRACT

In one embodiment, a photonic integrated circuit (PIC) device includes conductive pads on a surface of the PIC and a micro ring resonator (MRR) with a heater element centrally located between the conductive pads. The PIC also includes a cavity defined within a substrate of the PIC below the MRR, and a plurality of holes defined between the MRR and the conductive pads. The holes extend from a top surface of the PIC into the cavity, and each hole is between a respective conductive pad and the MRR.

20 Claims, 9 Drawing Sheets

Top View

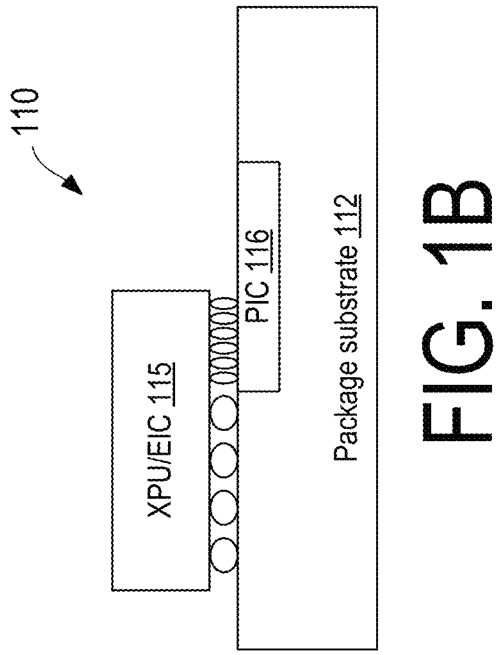
FIG. 1B
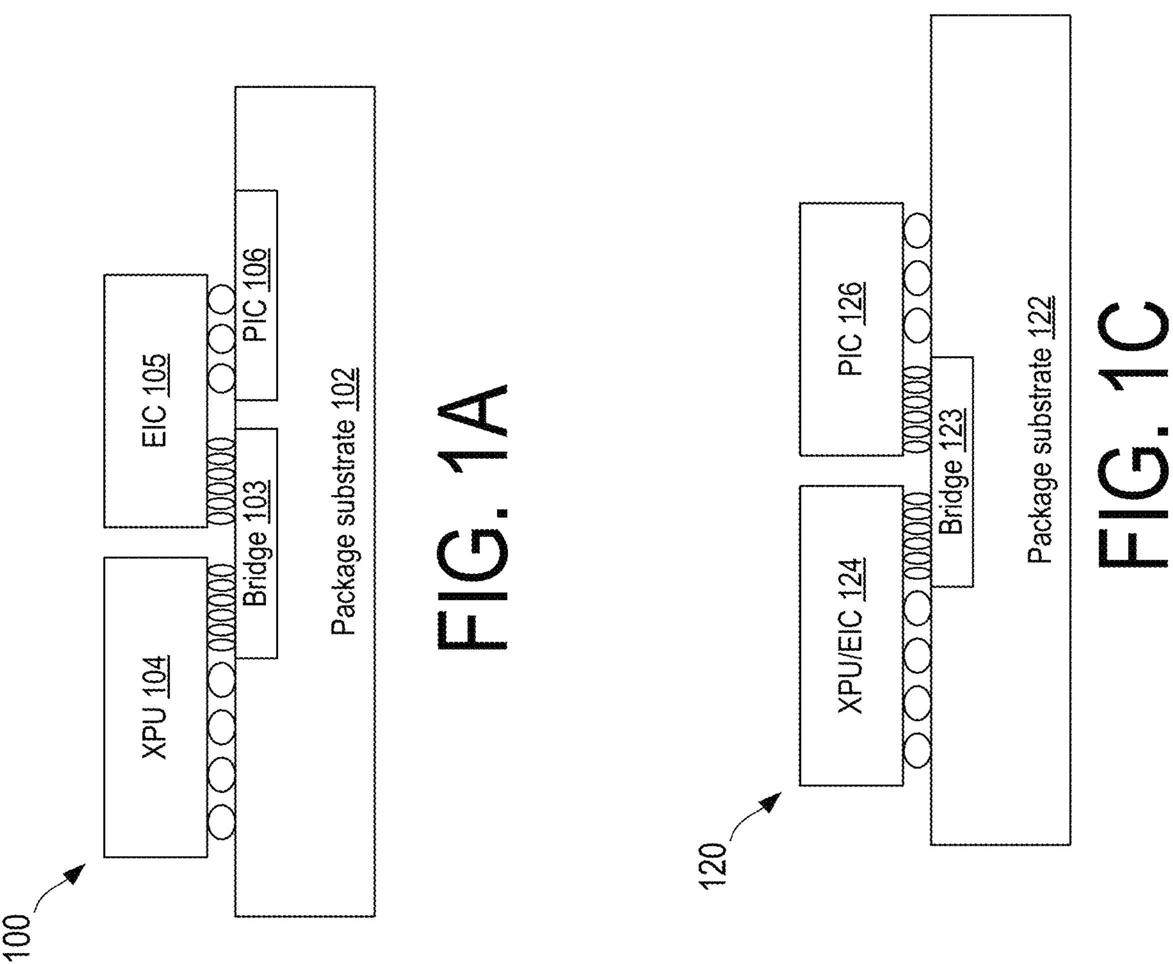
FIG. 1A
FIG. 1C

Side View A-A

Side View B-B

Top View

Top View

Side View A-A

Side View B-B

Trench Width (a) (um)

400

Undercut Size (b) (um)

UNDERCUT ARCHITECTURES FOR IMPROVED THERMAL EFFICIENCY IN PHOTONIC INTEGRATED CIRCUIT (PIC) ARCHITECTURES

GOVERNMENT INTEREST STATEMENT

This invention was made with Government support under Agreement No. HR00111830002 awarded by the United States Department of Defense. The Government has certain rights in the invention.

BACKGROUND

Photonic integrated circuit (PIC) architectures may utilize a wafer level undercut to enhance thermal efficiency around certain circuit elements, such as, for example, a micro ring resonator (MRR). These designs may implement an air trench to create the undercut area under the MRRs in the PIC. While there is no limitation of the undercut size, the air trench size and location may be limited by the optical and electrical routing of the PIC. For PICs in an open cavity package architecture (sometimes referred to as open cavity PICs, or OCPICs) or other PIC designs with bump pads, the undercut size is further restricted by bump pads of the PIC because overlap between the bump pads and the undercut can result in an unreliable mechanical structure.

BRIEF DESCRIPTION OF THE DRAWINGS

FIGS. 1A-1C illustrate examples of current integrated circuit packages that may implement embodiments of the present disclosure.

DETAILED DESCRIPTION

Figures 2A, 2B, 2C:
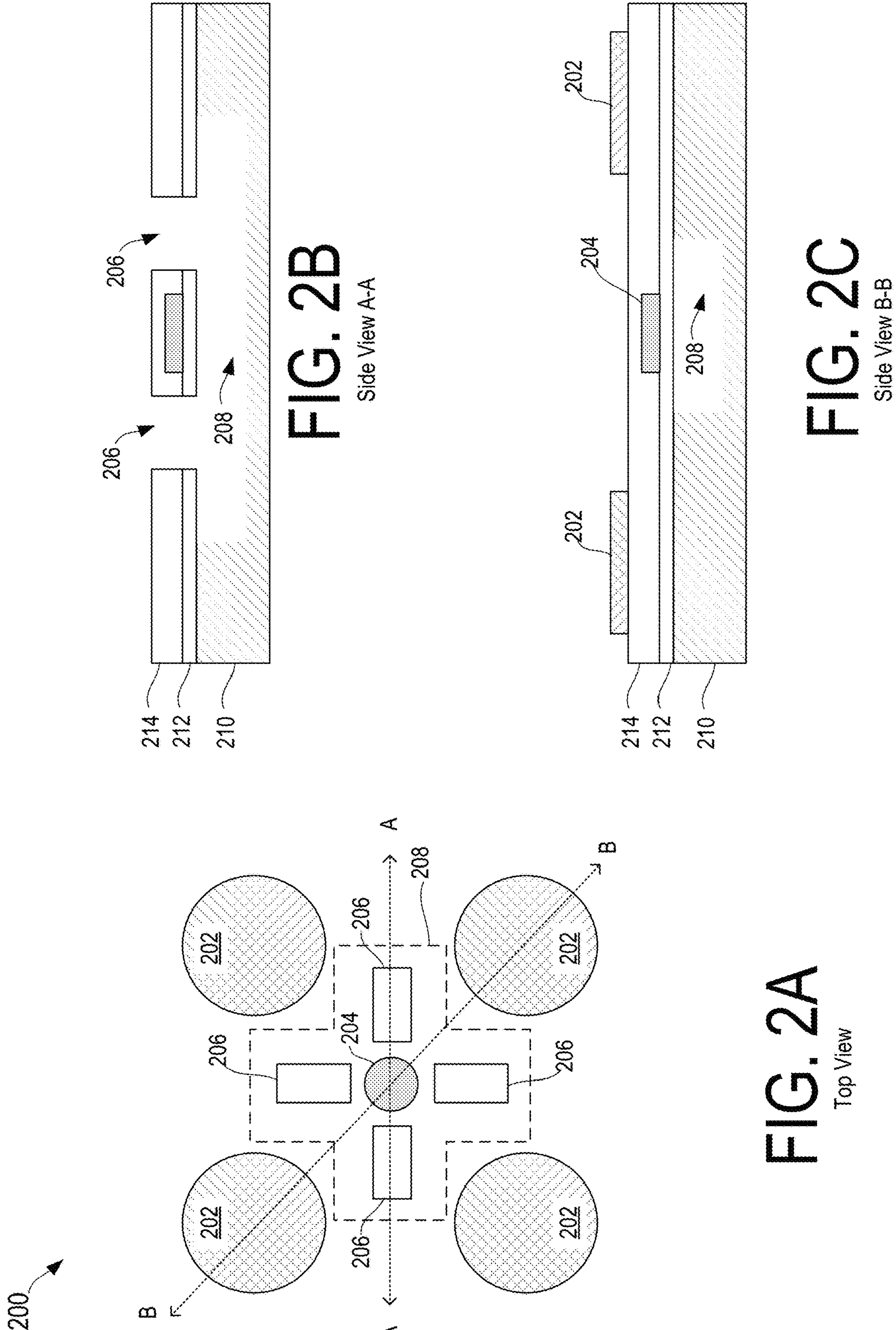
FIGS. 2A-2C illustrate an example undercut design that may be implemented in current PIC architectures.

Embodiments herein include undercut architectures that may provide improved thermal efficiency for optical circuit elements (e.g., micro ring resonators (MRRs with heater elements) in photonic integrated circuit (PIC) dies. Wafer-level undercut processes are well known and widely used for micro electromechanical systems (MEMS) manufacturing, and may be implemented within PIC dies, e.g., below MRRs, to provide for increased thermal efficiency of the MRR by thermally isolating the MRR (or other type of circuit element) from the substrate of the PIC die. That is, an undercut below the MRR can prevent heat from being transferred from the MRR to the PIC die substrate.

Embodiments herein may include a set of air trenches (which may refer to holes in the PIC die surface connected to the undercut cavity) that surround an optical circuit element of the PIC die, e.g., an MRR with a heater element. Certain embodiments may include a set of four rectangular air trenches and an additional four square air trenches surrounding an MRR, that can increase the undercut size below the MRR without interfering with the bump pads that surround the MRR that provide electrical signals to the MRR. This and other designs can achieve better thermal efficiency for PIC architectures, such as open cavity PIC (OCPIC) architectures, which can in turn reduce the energy required to tune the MRR to a higher temperature (sometimes referred to by the unit pJ/b). Since the air trenches and undercut provide thermal insulation, the micro-heater of an MRR can heat up the MRR with less energy compared to previous systems, resulting in a smaller pJ/b.

FIGS. 1A-1C illustrate examples of current integrated circuit packages 100, 110, 120 that may implement embodiments of the present disclosure. In each example shown, the package includes a package substrate (e.g., 102, 112, 122) with embedded bridge circuitry (e.g., 103 and 123) that provides interconnections between various chips in the package, e.g., between processing circuitry (XPU) 104 and an electronic integrated circuit (EIC) 105 as shown in FIG. 1A or between a PIC 126 and a chip 124 that includes both EIC and XPU processing circuitry as shown in FIG. 1C. The bridge circuitry may be, e.g., an Intel® embedded multi-die interconnect bridge (EMIB) and may include passive and/or active circuitry. Any of the XPU, PIC, and EIC can be manufactured from a wafer, similar to the dies 702 of FIG. 7, and the XPU may be an integrated circuit device similar to the integrated circuit device 800 of FIG. 8. The package substrate in each example may provide interconnections between a main circuitry board (e.g., a mother board or main board) and the XPU, PIC, and/or EIC.

The examples shown in FIGS. 1A-1B illustrate an example open cavity PIC (OCPIC) design, where the PIC circuitry (106, 116) is embedded within a cavity of the package substrate (102, 112), while the example shown in FIG. 1C includes PIC circuitry within a die 126 that is attached to the package substrate 122. In the example shown in FIG. 1B, the chip 115 includes both EIC and XPU processing circuitry and is connected to the PIC 116 directly without an embedded bridge circuit, as is shown in FIG. 1C.

The PIC in each example may include circuitry to receive optical signals from a source (e.g., attached fiber), convert the optical signals to electrical signals, and provide the electrical signals to other circuitry (e.g., to the EIC and/or the XPU). Likewise, the PIC includes circuitry to receive electrical signals (e.g., from the EIC and/or the XPU), generate optical signals based on the electrical signals, and provide the optical signals to the fiber. The PIC may include one or more lasers or other light sources, detectors, amplitude and/or phase modulators, filters, splitters, amplifiers, interferometers, micro ring resonators (MRR), gratings, squeezed or other quantum light sources, etc. The PIC circuitry may perform other functions beyond converting optical signals to electrical signals or vice versa, e.g., matrix multiplication, quantum logic gates, optical compute gates, etc. The EIC may include circuitry to control and/or drive the circuitry within the PIC and/or other electrical circuitry for processing the signals from the PIC. For instance, the EIC may include components such as, for example, transimpedance amplifiers (TIA), serializer/deserializer (SERDES) circuits, driver circuits, etc. The optical signals may be received from an array of fiber, e.g., a fiber pigtail connection, that is coupled to the PIC, e.g., via v-groove connections.

The XPU in each example may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. In some embodiments, the XPU may be a network switch ASIC.

FIGS. 2A-2C illustrate an example undercut design that may be implemented in current PIC architectures. In particular, FIG. 2A illustrates a top view of the undercut design, while FIGS. 2B and 2C illustrate cross-sectional side views along the A-A and B-B cut lines of FIG. 2A, respectively. The example shown includes four bump pads 202, which are on an external surface of the PIC and are used to electrically connect the PIC to other circuitry of an integrated circuit package (e.g., those shown in FIGS. 1A-1C). There is a circuit element 204 centrally located between each of the four bump pads 202. The circuit element may be, for example, a micro ring resonator (MRR) (with a heater element) or another type of circuit element of a PIC. In addition, there are four air trenches 206 located above, below, and to the left and right sides of the circuit element 204 as shown. As used herein, an air trench may refer to a hole through the surface of a PIC die that exposes and connects a cavity (also referred to as an undercut region 208) within the substrate (210) of the PIC die to the outside of the PIC die. These air trenches 206 create a "+" shaped undercut region 208 within the PIC below, e.g., as shown in FIGS. 2B-2C. The undercut region 208 is centered between the bump pads 202 as shown.

As shown in FIGS. 2B-2C, the PIC includes a substrate 210 (e.g., Silicon or other suitable type of substrate), with two dielectric layers 212, 214 (e.g., $SiO_2$ or another suitable material) on the substrate 210. The circuit element 204 is formed within the second dielectric layer 214 in the example shown, and may be made from Silicon or other semiconductor materials. It can be observed from FIG. 2B that the circuit element 204 is located far away from the substrate 210 in the vertical and horizontal directions, resulting in good thermal insulation. However, in the diagonal directions, as shown in FIG. 2C, the circuit element 204 is much closer to the substrate 210, resulting in possible heat lost to the substrate, which can in turn impact the thermal efficiency of the circuit element (e.g., where the circuit element is an MRR).

Figures 3A, 3B, 3C:
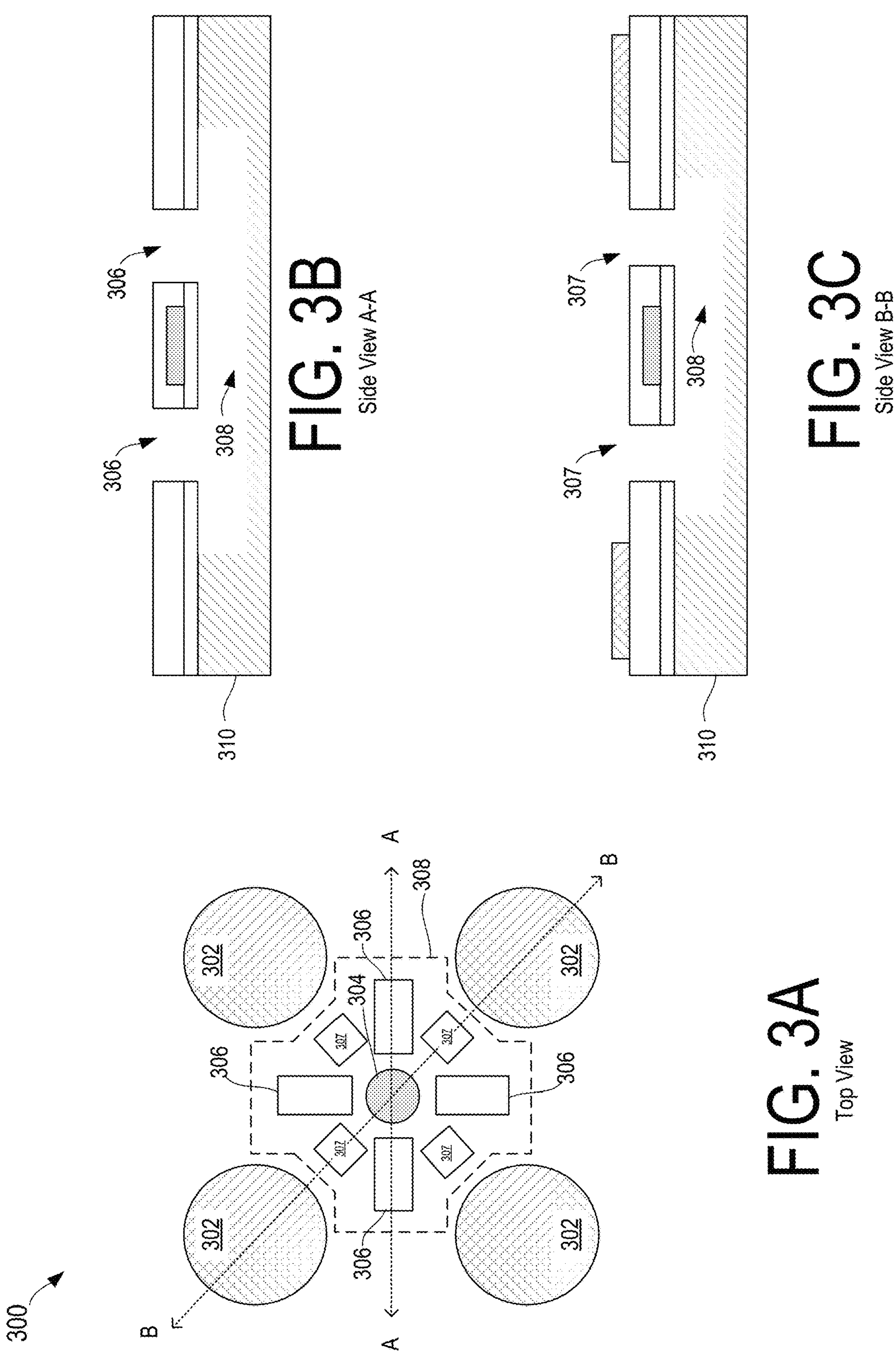
FIGS. 3A-3C illustrate an example improved undercut for a PIC in accordance with embodiments herein.

FIGS. 3A-3C illustrate an example improved undercut design for a PIC in accordance with embodiments herein. In particular, FIG. 3A illustrates a top view of the undercut design, while FIGS. 3B and 3C illustrate cross-sectional side views along the A-A and B-B cut lines of FIG. 3A, respectively. Like the previous FIGS., the example shown in FIGS. 3A-3C includes four bump pads 302, which are on an external surface of the PIC and are used to electrically connect the PIC to other circuitry of an integrated circuit package (e.g., those shown in FIGS. 1A-1C). There is also a circuit element 304 centrally located between each of the four bump pads 302. The circuit element may be, for example, a micro ring resonator (MRR) or another type of circuit element of a PIC. In the design shown, however, there are eight total air trenches 306 surrounding the circuit element 304. In particular, the design includes the same four air trenches 306 as in the designs shown in FIGS. 2A-2C (i.e., above, below, and to the left and right sides of the circuit element 304), plus an additional four air trenches 307 between the air trenches 306 and in line with the diagonal bump pads 302 and centered circuit element 304. In the example shown, the air trenches 306 are rectangular shapes and the air trenches 307 are square shaped; however, any suitable shape may be implemented for either of the air trenches 306, 307. For example, the air trenches 306, 307 may be formed in a circular or oval shaped manner. The air trenches 306, 307 may result in an undercut region 308 that is larger than the undercut region 208 in the previous example. The size and location of the air trenches may be carefully designed based on the empirical correlation, e.g., based on the correlation shown in FIG. 4.

It can be seen that the resulting undercut region 308 keeps the circuit element 304 (e.g., an MRR) away from the substrate 310 in all directions. When a circuit element such as an MRR is far away from the substrate, it will reduce heat lost to the substrate, resulting in a significantly higher thermal efficiency for the MRR. This thermal decoupling may also be beneficial for other types of circuit elements as well, and as such, the example undercut design may be implemented with other types of circuit elements than just an MRR.

Figure 4:
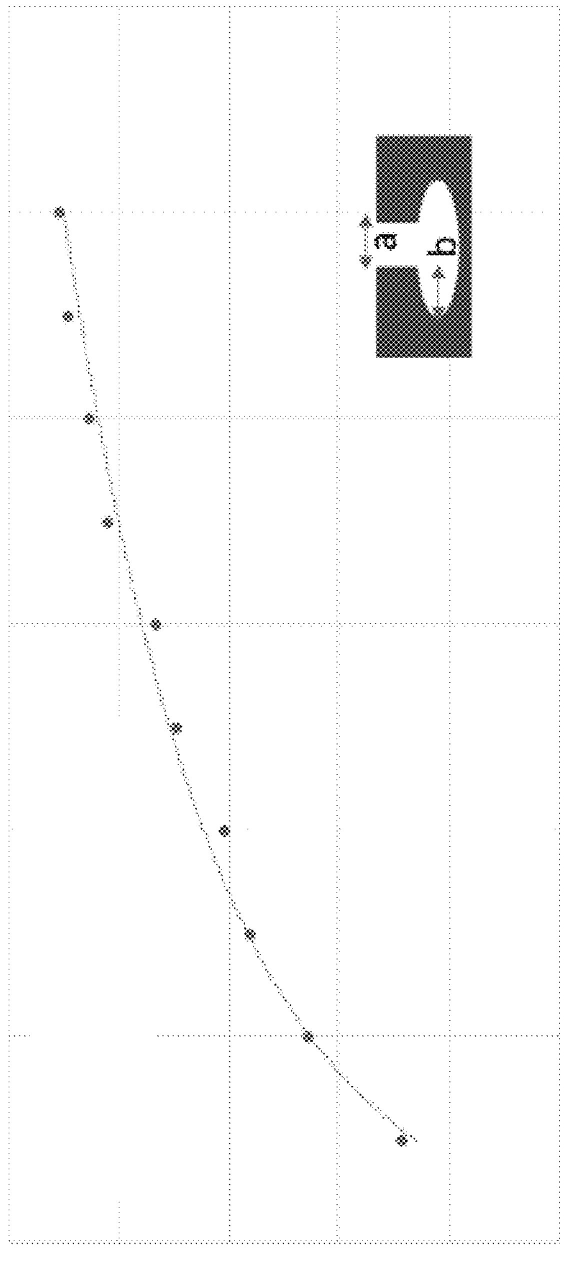
FIG. 4 illustrates a correlation between the width of an air trench (a) and the size of an undercut region (b) in accordance with embodiments herein.

FIG. 4 illustrates a correlation between the width of an air trench (a) and the size of an undercut region (b) in accordance with embodiments herein. As previously discussed, the size and layout of the air trenches in a wafer undercut PIC design, such as the air trenches 306 and 307 of FIGS. 3A-3C, may be determined based on the correlation shown in FIG. 4. For instance, it may be desirable to select sizes for the air trenches 306, 307 that maximize the size of the undercut region 308 without having the region 308 encroach upon the region under the bump pads 302.

Figure 5B:
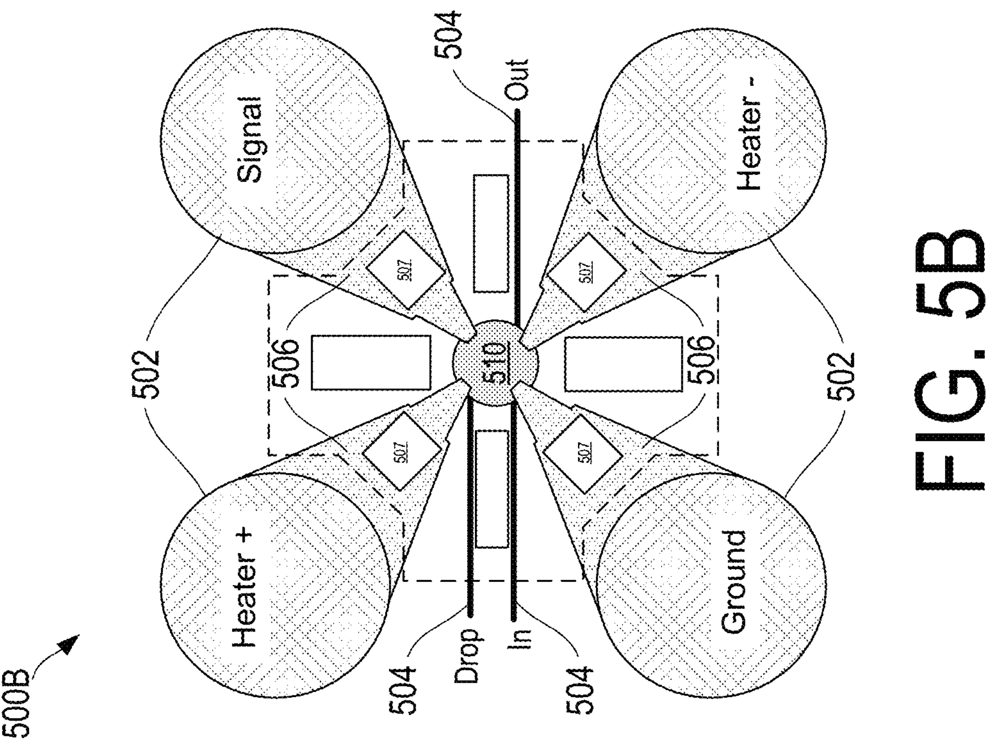
FIGS. 5A-5B illustrate example signaling layouts for a MRR of a PIC in accordance with embodiments herein.
Figure 5A:
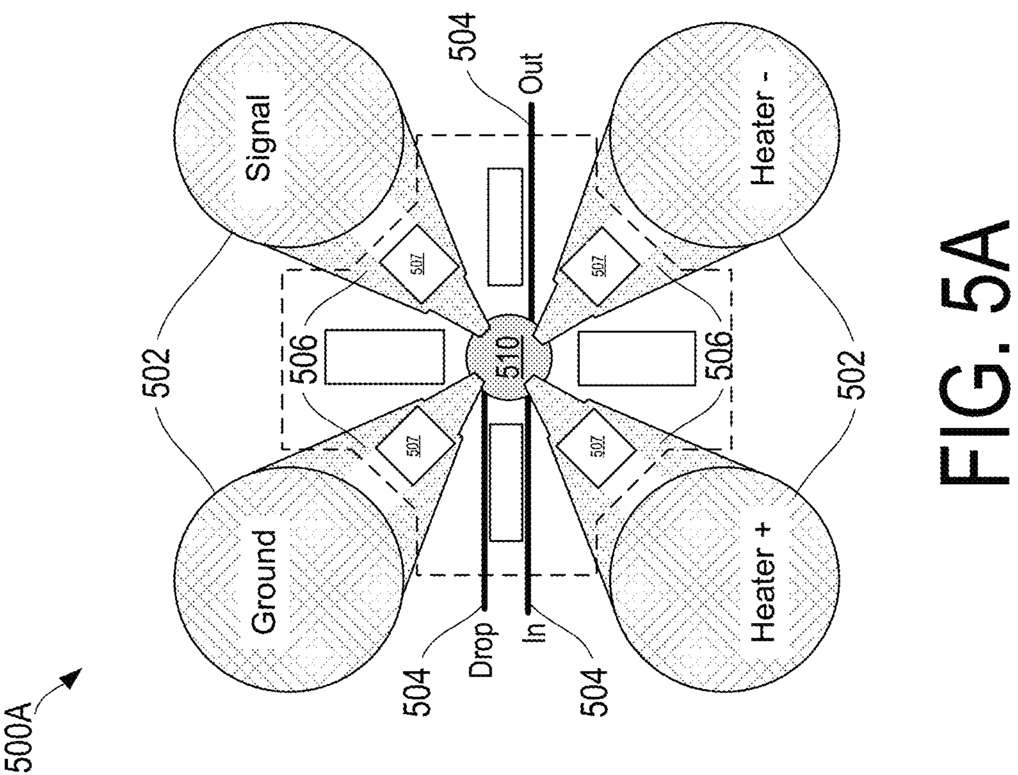

FIGS. 5A-5B illustrate example signaling layouts for a MRR of a PIC in accordance with embodiments herein. As shown, there is sufficient space in the example design shown in FIGS. 3A-3C to route waveguides 504 and metal traces 506 (that connect the bump pads 502 and the MRR 510 in the center of the pads) between and/or around the air trenches 507. In the example layout shown in FIG. 5A, the bump pads 502 are laid out with the ground pad in the top left, signal pad in the top right, positive heater pad in the bottom left, and the negative heater pad in the bottom right. In the example layout shown in FIG. 5B, the bump pads 502 are laid out with the positive heater pad in the top left, signal pad in the top right, ground pad in the bottom left, and the negative heater pad in the bottom right. In both examples, the Drop signal and In signal waveguides enter the MRR 510 from the left, and the Out signal waveguide exits on the right.

Figure 6:
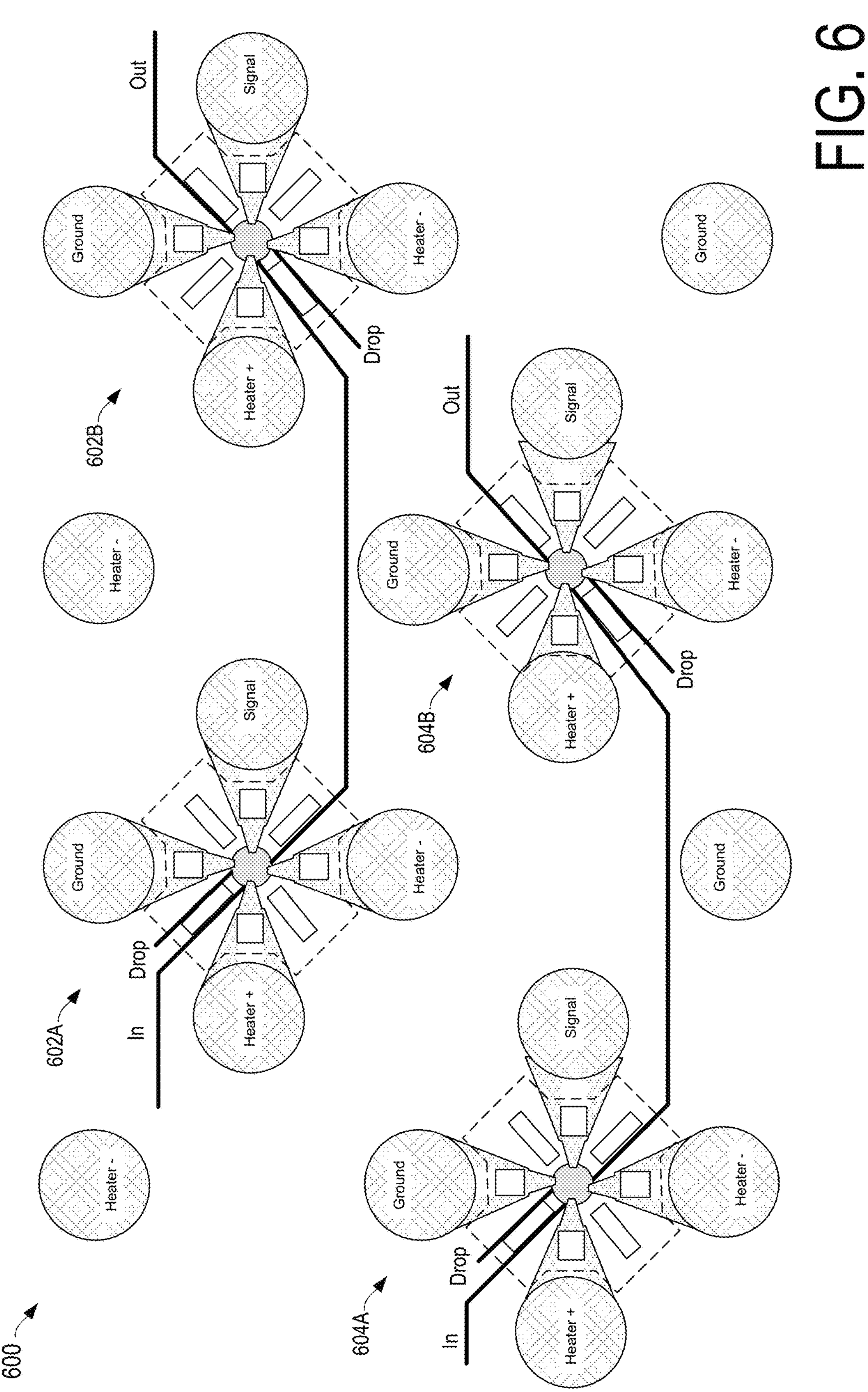
FIG. 6 illustrates an example signaling layout for a plurality of MRRs of a PIC in accordance with embodiments herein.

FIG. 6 illustrates an example signaling layout for a plurality of MRRs of a PIC in accordance with embodiments herein. In the example shown, the layout of FIG. 5A is expanded into a diamond or HEX pattern, with certain of the layouts being interconnected. That is, the Out waveguide from a first MRR/pad set 602A is provided as the In waveguide signal to a second MRR/pad set 602B. Likewise, the Out waveguide from a third MRR/pad set 604A is provided as the In waveguide signal to a fourth MRR/pad set 604B.

Figure 7:
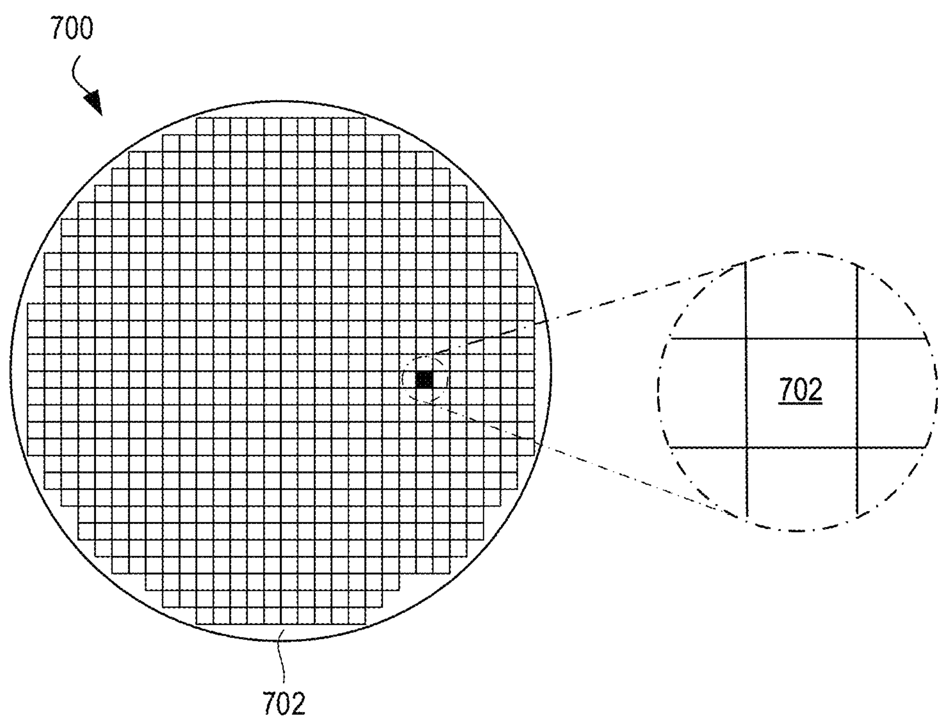
FIG. 7 is a top view of a wafer and dies that may be included in a microelectronic assembly, in accordance with any of the embodiments disclosed herein.

FIG. 7 is a top view of a wafer 700 and dies 702 that may be implemented in or along with any of the embodiments disclosed herein. The wafer 700 may be composed of semiconductor material and may include one or more dies 702 having integrated circuit structures formed on a surface of the wafer 700. The individual dies 702 may be a repeating unit of an integrated circuit product that includes any suitable integrated circuit. After the fabrication of the semiconductor product is complete, the wafer 700 may undergo a singulation process in which the dies 702 are separated from one another to provide discrete "chips" of the integrated circuit product. The die 702 may include one or more transistors (e.g., some of the transistors 840 of FIG. 8, discussed below), supporting circuitry to route electrical signals to the transistors, passive components (e.g., signal traces, resistors, capacitors, or inductors), and/or any other integrated circuit components. In some embodiments, the wafer 700 or the die 702 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 702. For example, a memory array formed by multiple memory devices may be formed on a same die 702 as a processor unit (e.g., the processor unit 902 of FIG. 9) or other logic that is configured to store information in the memory devices or execute instructions stored in the memory array.

Figure 8:
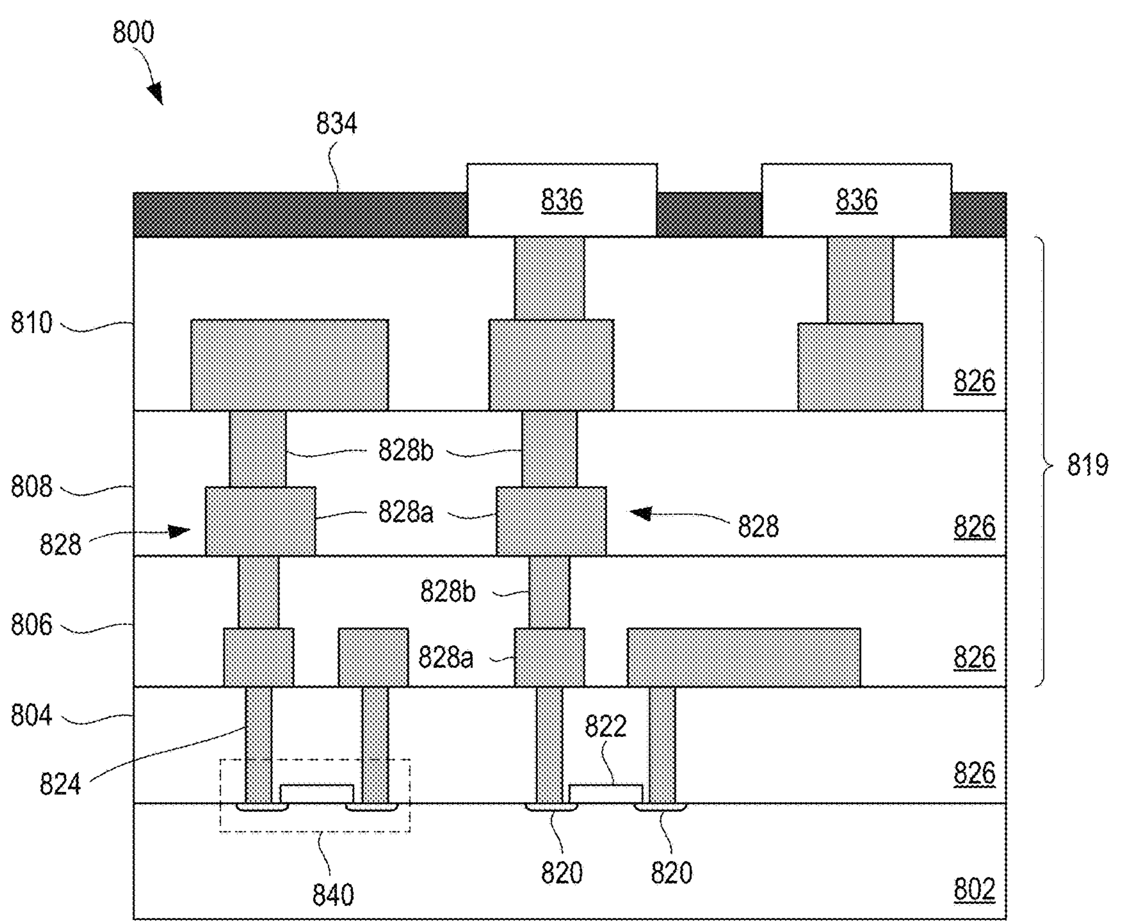
FIG. 8 is a cross-sectional side view of an integrated circuit device that may be included in a microelectronic assembly, in accordance with any of the embodiments disclosed herein.

FIG. 8 is a cross-sectional side view of an integrated circuit device 800 that may be included in any of the embodiments disclosed herein. One or more of the integrated circuit devices 800 may be included in one or more dies 702 (FIG. 7). The integrated circuit device 800 may be formed on a die substrate 802 (e.g., the wafer 700 of FIG. 7) and may be included in a die (e.g., the die 702 of FIG. 7). The die substrate 802 may be a semiconductor substrate composed of semiconductor material systems including, for example, n-type or p-type materials systems (or a combination of both). The die substrate 802 may include, for example, a crystalline substrate formed using a bulk silicon or a silicon-on-insulator (SOI) substructure. In some embodiments, the die substrate 802 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 802. Although a few examples of materials from which the die substrate 802 may be formed are described here, any material that may serve as a foundation for an integrated circuit device 800 may be used. The die substrate 802 may be part of a singulated die (e.g., the dies 702 of FIG. 7) or a wafer (e.g., the wafer 700 of FIG. 7).

The integrated circuit device 800 may include one or more device layers 804 disposed on the die substrate 802. The device layer 804 may include features of one or more transistors 840 (e.g., metal oxide semiconductor field-effect transistors (MOSFETs)) formed on the die substrate 802. The transistors 840 may include, for example, one or more source and/or drain (S/D) regions 820, a gate 822 to control current flow between the S/D regions 820, and one or more S/D contacts 824 to route electrical signals to/from the S/D regions 820. The transistors 840 may include additional features not depicted for the sake of clarity, such as device isolation regions, gate contacts, and the like. The transistors 840 are not limited to the type and configuration depicted in FIG. 8 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

Returning to FIG. 8, a transistor 840 may include a gate 822 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 840 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 840 along the source-channel-drain direction, the gate electrode may consist of a U-shaped structure that includes a bottom portion substantially parallel to the surface of the die substrate 802 and two sidewall portions that are substantially perpendicular to the top surface of the die substrate 802. In other embodiments, at least one of the metal layers that form the gate electrode may simply be a planar layer that is substantially parallel to the top surface of the die substrate 802 and does not include sidewall portions substantially perpendicular to the top surface of the die substrate 802. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 820 may be formed within the die substrate 802 adjacent to the gate 822 of individual transistors 840. The S/D regions 820 may be formed using an implantation/diffusion process or an etching/deposition process, for example. In the former process, dopants such as boron, aluminum, antimony, phosphorous, or arsenic may be ion-implanted into the die substrate 802 to form the S/D regions 820. An annealing process that activates the dopants and causes them to diffuse farther into the die substrate 802 may follow the ion-implantation process. In the latter process, the die substrate 802 may first be etched to form recesses at the locations of the S/D regions 820. An epitaxial deposition process may then be carried out to fill the recesses with material that is used to fabricate the S/D regions 820. In some implementations, the S/D regions 820 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 820 may be formed using one or more alternate semiconductor materials such as germanium or a group III-V material or alloy. In further embodiments, one or more layers of metal and/or metal alloys may be used to form the S/D regions 820.

Electrical signals, such as power and/or input/output (I/O) signals, may be routed to and/or from the devices (e.g., transistors 840) of the device layer 804 through one or more interconnect layers disposed on the device layer 804 (illustrated in FIG. 8 as interconnect layers 806-810). For example, electrically conductive features of the device layer 804 (e.g., the gate 822 and the S/D contacts 824) may be electrically coupled with the interconnect structures 828 of the interconnect layers 806-810. The one or more interconnect layers 806-810 may form a metallization stack (also referred to as an "ILD stack") 819 of the integrated circuit device 800.

The interconnect structures 828 may be arranged within the interconnect layers 806-810 to route electrical signals according to a wide variety of designs; in particular, the arrangement is not limited to the particular configuration of interconnect structures 828 depicted in FIG. 8. Although a particular number of interconnect layers 806-810 is depicted in FIG. 8, embodiments of the present disclosure include integrated circuit devices having more or fewer interconnect layers than depicted.

In some embodiments, the interconnect structures 828 may include lines **828*a* and/or vias 828*b* filled with an electrically conductive material such as a metal. The lines 828*a* may be arranged to route electrical signals in a direction of a plane that is substantially parallel with a surface of the die substrate 802 upon which the device layer 804 is formed. For example, the lines 828*a* may route electrical signals in a direction in and out of the page and/or in a direction across the page from the perspective of FIG. 8. The vias 828*b* may be arranged to route electrical signals in a direction of a plane that is substantially perpendicular to the surface of the die substrate 802 upon which the device layer 804 is formed. In some embodiments, the vias 828*b* may electrically couple lines 828*a* of different interconnect layers 806-810** together.

The interconnect layers 806-810 may include a dielectric material 826 disposed between the interconnect structures 828, as shown in FIG. 8. In some embodiments, dielectric material 826 disposed between the interconnect structures 828 in different ones of the interconnect layers 806-810 may have different compositions; in other embodiments, the composition of the dielectric material 826 between different interconnect layers 806-810 may be the same. The device layer 804 may include a dielectric material 826 disposed between the transistors 840 and a bottom layer of the metallization stack as well. The dielectric material 826 included in the device layer 804 may have a different composition than the dielectric material 826 included in the interconnect layers 806-810; in other embodiments, the composition of the dielectric material 826 in the device layer 804 may be the same as a dielectric material 826 included in any one of the interconnect layers 806-810.

A first interconnect layer 806 (referred to as Metal 1 or "M1") may be formed directly on the device layer 804. In some embodiments, the first interconnect layer 806 may include lines **828*a* and/or vias 828*b*, as shown. The lines 828*a* of the first interconnect layer 806 may be coupled with contacts (e.g., the S/D contacts 824) of the device layer 804. The vias 828*b* of the first interconnect layer 806 may be coupled with the lines 828*a* of a second interconnect layer 808**.

The second interconnect layer 808 (referred to as Metal 2 or "M2") may be formed directly on the first interconnect layer 806. In some embodiments, the second interconnect layer 808 may include via **828*b* to couple the lines of the interconnect structures 828 of the second interconnect layer 808 with the lines 828*a* of a third interconnect layer 810. Although the lines 828*a* and the vias 828*b* are structurally delineated with a line within individual interconnect layers for the sake of clarity, the lines 828*a* and the vias 828*b*** may be structurally and/or materially contiguous (e.g., simultaneously filled during a dual-damascene process) in some embodiments.

The third interconnect layer 810 (referred to as Metal 3 or "M3") (and additional interconnect layers, as desired) may be formed in succession on the second interconnect layer 808 according to similar techniques and configurations described in connection with the second interconnect layer 808 or the first interconnect layer 806. In some embodiments, the interconnect layers that are "higher up" in the metallization stack 819 in the integrated circuit device 800 (i.e., farther away from the device layer 804) may be thicker that the interconnect layers that are lower in the metallization stack 819, with lines **828*a* and vias 828*b*** in the higher interconnect layers being thicker than those in the lower interconnect layers.

The integrated circuit device 800 may include a solder resist material 834 (e.g., polyimide or similar material) and one or more conductive contacts 836 formed on the interconnect layers 806-810. In FIG. 8, the conductive contacts 836 are illustrated as taking the form of bond pads. The conductive contacts 836 may be electrically coupled with the interconnect structures 828 and configured to route the electrical signals of the transistor(s) 840 to external devices. For example, solder bonds may be formed on the one or more conductive contacts 836 to mechanically and/or electrically couple an integrated circuit die including the integrated circuit device 800 with another component (e.g., a printed circuit board or a package substrate, e.g., 112). The integrated circuit device 800 may include additional or alternate structures to route the electrical signals from the interconnect layers 806-810; for example, the conductive contacts 836 may include other analogous features (e.g., posts) that route the electrical signals to external components.

In some embodiments in which the integrated circuit device 800 is a double-sided die, the integrated circuit device 800 may include another metallization stack (not shown) on the opposite side of the device layer(s) 804. This metallization stack may include multiple interconnect layers as discussed above with reference to the interconnect layers 806-810, to provide conductive pathways (e.g., including conductive lines and vias) between the device layer(s) 804 and additional conductive contacts (not shown) on the opposite side of the integrated circuit device 800 from the conductive contacts 836.

In other embodiments in which the integrated circuit device 800 is a double-sided die, the integrated circuit device 800 may include one or more through silicon vias (TSVs) through the die substrate 802; these TSVs may make contact with the device layer(s) 804, and may provide conductive pathways between the device layer(s) 804 and additional conductive contacts (not shown) on the opposite side of the integrated circuit device 800 from the conductive contacts 836. In some embodiments, TSVs extending through the substrate can be used for routing power and ground signals from conductive contacts on the opposite side of the integrated circuit device 800 from the conductive contacts 836 to the transistors 840 and any other components integrated into the device 800, and the metallization stack 819 can be used to route I/O signals from the conductive contacts 836 to transistors 840 and any other components integrated into the device 800.

Multiple integrated circuit devices 800 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 9:
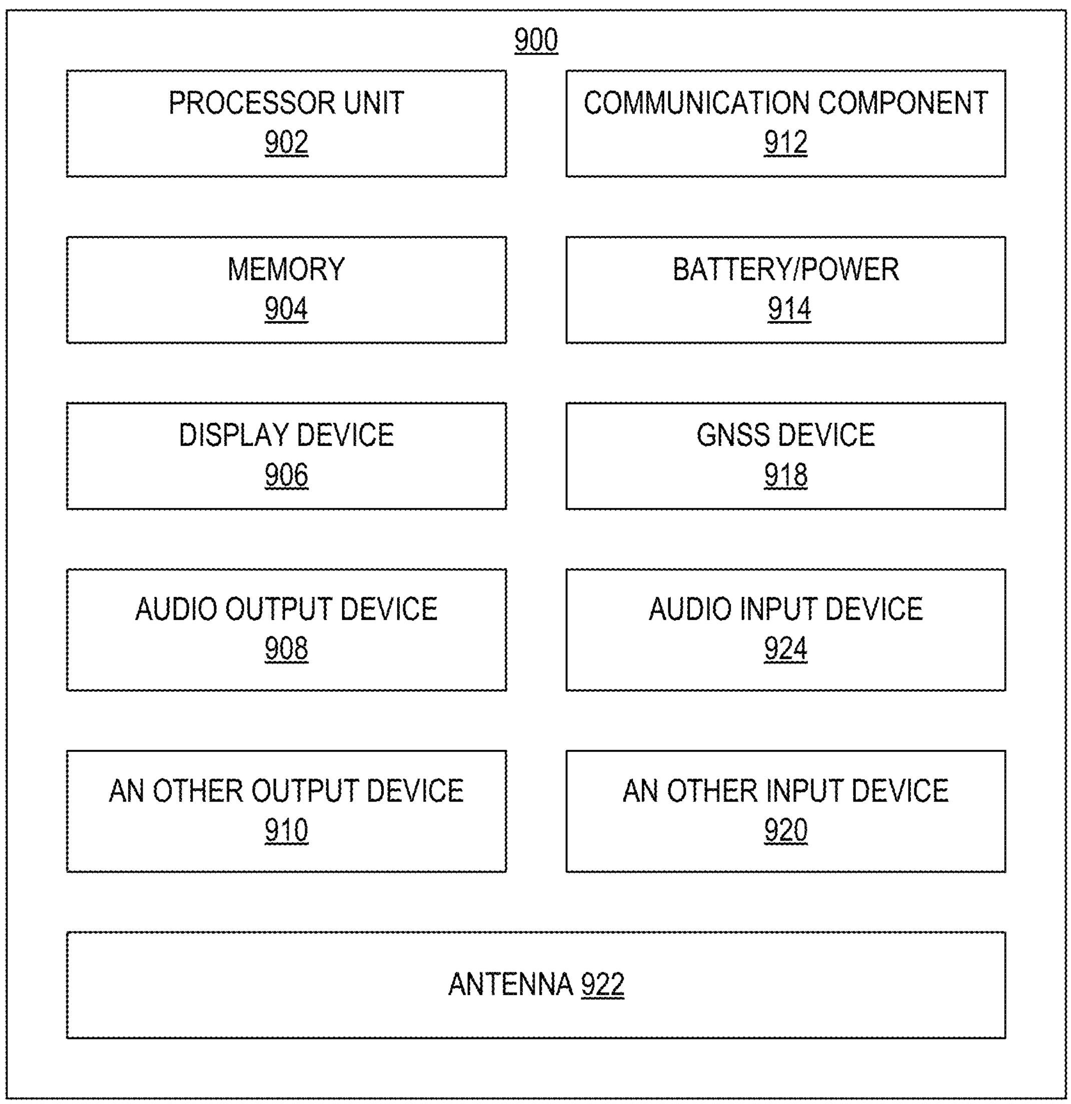
FIG. 9 is a block diagram of an example electrical device that may include a microelectronic assembly, in accordance with any of the embodiments disclosed herein.

FIG. 9 is a block diagram of an example electrical device 900 that may include one or more of the embodiments disclosed herein. For example, any suitable ones of the components of the electrical device 900 may include one or more of integrated circuit devices 800, or integrated circuit dies 702 disclosed herein. A number of components are illustrated in FIG. 9 as included in the electrical device 900, but any one or more of these components may be omitted or duplicated, as suitable for the application. In some embodiments, some or all of the components included in the electrical device 900 may be attached to one or more motherboards mainboards, or system boards. In some embodiments, one or more of these components are fabricated onto a single system-on-a-chip (SoC) die.

Additionally, in various embodiments, the electrical device 900 may not include one or more of the components illustrated in FIG. 9, but the electrical device 900 may include interface circuitry for coupling to the one or more components. For example, the electrical device 900 may not include a display device 906, but may include display device interface circuitry (e.g., a connector and driver circuitry) to which a display device 906 may be coupled. In another set of examples, the electrical device 900 may not include an audio input device 924 or an audio output device 908, but may include audio input or output device interface circuitry (e.g., connectors and supporting circuitry) to which an audio input device 924 or audio output device 908 may be coupled.

The electrical device 900 may include one or more processor units 902 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 902 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 900 may include a memory 904, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 904 may include memory that is located on the same integrated circuit die as the processor unit 902. This memory may be used as cache memory (e.g., Level 1 (L1), Level 2 (L2), Level 3 (L3), Level 4 (LA), Last Level Cache (LLC)) and may include embedded dynamic random access memory (DRAM) or spin transfer torque magnetic random access memory (STT-MRAM).

In some embodiments, the electrical device 900 can comprise one or more processor units 902 that are heterogeneous or asymmetric to another processor unit 902 in the electrical device 900. There can be a variety of differences between the processing units 902 in a system in terms of a spectrum of metrics of merit including architectural, microarchitectural, thermal, power consumption characteristics, and the like. These differences can effectively manifest themselves as asymmetry and heterogeneity among the processor units 902 in the electrical device 900.

In some embodiments, the electrical device 900 may include a communication component 912 (e.g., one or more communication components). For example, the communication component 912 can manage wireless communications for the transfer of data to and from the electrical device 900. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 912 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 912 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 912 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 912 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 912 may operate in accordance with other wireless protocols in other embodiments. The electrical device 900 may include an antenna 922 to facilitate wireless communications and/or to receive other wireless communications (such as AM or FM radio transmissions).

In some embodiments, the communication component 912 may manage wired communications, such as electrical, optical, or any other suitable communication protocols (e.g., IEEE 802.3 Ethernet standards). As noted above, the communication component 912 may include multiple communication components. For instance, a first communication component 912 may be dedicated to shorter-range wireless communications such as Wi-Fi or Bluetooth, and a second communication component 912 may be dedicated to longer-range wireless communications such as global positioning system (GPS), EDGE, GPRS, CDMA, WiMAX, LTE, EV-DO, or others. In some embodiments, a first communication component 912 may be dedicated to wireless communications, and a second communication component 912 may be dedicated to wired communications.

The electrical device 900 may include battery/power circuitry 914. The battery/power circuitry 914 may include one or more energy storage devices (e.g., batteries or capacitors) and/or circuitry for coupling components of the electrical device 900 to an energy source separate from the electrical device 900 (e.g., AC line power).

The electrical device 900 may include a display device 906 (or corresponding interface circuitry, as discussed above). The display device 906 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 900 may include an audio output device 908 (or corresponding interface circuitry, as discussed above). The audio output device 908 may include any embedded or wired or wirelessly connected external device that generates an audible indicator, such speakers, headsets, or earbuds.

The electrical device 900 may include an audio input device 924 (or corresponding interface circuitry, as discussed above). The audio input device 924 may include any embedded or wired or wirelessly connected device that generates a signal representative of a sound, such as microphones, microphone arrays, or digital instruments (e.g., instruments having a musical instrument digital interface (MIDI) output). The electrical device 900 may include a Global Navigation Satellite System (GNSS) device 918 (or corresponding interface circuitry, as discussed above), such as a Global Positioning System (GPS) device. The GNSS device 918 may be in communication with a satellite-based system and may determine a geolocation of the electrical device 900 based on information received from one or more GNSS satellites, as known in the art.

The electrical device 900 may include another output device 910 (or corresponding interface circuitry, as discussed above). Examples of the other output device 910 may include an audio codec, a video codec, a printer, a wired or wireless transmitter for providing information to other devices, or an additional storage device.

The electrical device 900 may include another input device 920 (or corresponding interface circuitry, as discussed above). Examples of the other input device 920 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 900 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 900 may be any other electronic device that processes data. In some embodiments, the electrical device 900 may comprise multiple discrete physical components. Given the range of devices that the electrical device 900 can be manifested as in various embodiments, in some embodiments, the electrical device 900 can be referred to as a computing device or a computing system.

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

EXAMPLE 1 is an apparatus comprising: a substrate; one or more dielectric layers on the substrate; an optical circuit element in one of the dielectric layers; a cavity defined within the substrate below the optical circuit element; conductive pads on the dielectric layers and on opposite sides of the optical circuit element; a plurality of holes defined through the dielectric layers and into the cavity, each hole formed between a respective conductive pad and the optical circuit element.

EXAMPLE 2 includes the subject matter of Example 1, wherein the optical circuit element is a micro ring resonator (MRR) with a heater element.

EXAMPLE 3 includes the subject matter of Example 1 or 2, wherein the optical element is centrally located between the plurality of holes.

EXAMPLE 4 includes the subject matter of any one of Examples 1-3, wherein a center of each hole of the plurality of holes is aligned with a center of its respective conductive pad and the optical circuit element.

EXAMPLE 5 includes the subject matter of any one of Examples 1-4, wherein the holes are rectangular.

EXAMPLE 6 includes the subject matter of any one of Examples 1-5, wherein the holes are square.

EXAMPLE 7 includes the subject matter of any one of Examples 1-6, wherein the plurality of holes is a first set of holes and the apparatus further comprises a second set of holes defined through the dielectric layers and into the cavity, each hole of the second set of holes formed between a pair of holes of the first set of holes.

EXAMPLE 8 includes the subject matter of Example 7, wherein the optical element is centrally located between the first set of holes and the second set of holes.

EXAMPLE 9 includes the subject matter of any one of Examples 1-8, wherein the cavity is not defined under the conductive pads.

EXAMPLE 10 includes the subject matter of any one of Examples 1-9, further comprising conductive traces connecting the conductive pads to the optical circuit element.

EXAMPLE 11 includes the subject matter of any one of Examples 1-10, further comprising optical waveguides connected to the optical circuit element, each optical waveguide between two of the plurality of holes.

EXAMPLE 12 is a photonic integrated circuit (PIC) device, comprising: conductive pads on a surface of the PIC; a micro ring resonator (MRR) with a heater element, wherein the MRR is centrally located between the conductive pads; a cavity defined within a substrate of the PIC below the MRR; and a plurality of holes defined between the MRR and the conductive pads, the plurality of holes extending from a top surface of the PIC into the cavity, each hole between a respective conductive pad and the MRR.

EXAMPLE 13 includes the subject matter of Example 12, wherein the MRR is centrally located between the plurality of holes.

EXAMPLE 14 includes the subject matter of Example 12 or 13, wherein a center of each hole of the plurality of holes is aligned with a center of its respective conductive pad and the optical circuit element.

EXAMPLE 15 includes the subject matter of any one of Examples 12-14, wherein the holes are rectangular.

EXAMPLE 16 includes the subject matter of any one of Examples 12-15, wherein the holes are square.

EXAMPLE 17 includes the subject matter of any one of Examples 12-16, wherein the plurality of holes is a first set of holes and the PIC further comprises a second set of holes extending from the top surface of the PIC into the cavity, each hole of the second set of holes formed between a pair of holes of the first set of holes.

EXAMPLE 18 includes the subject matter of Example 17, wherein the MRR is centrally located between the first set of holes and the second set of holes.

EXAMPLE 19 includes the subject matter of any one of Examples 12-18, wherein the cavity is not defined under the conductive pads.

EXAMPLE 20 includes the subject matter of any one of Examples 12-19, further comprising conductive traces connecting the conductive pads to the optical circuit element.

EXAMPLE 21 includes the subject matter of any one of Examples 12-20, further comprising optical waveguides connected to the MRR, each optical waveguide between two of the plurality of holes.

EXAMPLE 22 is an integrated circuit package comprising: a package substrate; an electronic integrated circuit (EIC); and a photonic integrated circuit (PIC) coupled to the EIC, the PIC according to any one of Examples 12-21.

EXAMPLE 23 is an apparatus comprising: a substrate; one or more dielectric layers on the substrate; a first conductive pad on the dielectric layers; a second conductive pad on the dielectric layers; an optical circuit element in one of the dielectric layers, the optical circuit element between the first conductive pad and the second conductive pad; a cavity defined within the substrate below the optical circuit element; a first hole defined through the dielectric layers and into the cavity, the first hole formed between the first conductive pad and the optical circuit element; and a second hole defined through the dielectric layers and into the cavity, the second hole formed between the second conductive pad and the optical circuit element.

EXAMPLE 24 includes the subject matter of Example 23, wherein the optical element is centrally located between the first hole and the second hole.

EXAMPLE 25 includes the subject matter of Example 23 or 24, wherein a center of the first hole is aligned with a center of the first conductive pad and a center of the optical circuit element, and a center of the second hole is aligned with a center of the second conductive pad and a center of the optical circuit element.

EXAMPLE 26 includes the subject matter of any one of Examples 23-25, further comprising: a third conductive pad on the dielectric layers; a fourth conductive pad on the dielectric layers; a third hole defined through the dielectric layers and into the cavity, the third hole formed between the third conductive pad and the optical circuit element; and a fourth hole defined through the dielectric layers and into the cavity, the fourth hole formed between the fourth conductive pad and the optical circuit element.

EXAMPLE 27 includes the subject matter of Example 26, further comprising: a fifth hole defined through the dielectric layers and into the cavity, the fifth hole formed between the first hole and the third hole; a sixth hole defined through the dielectric layers and into the cavity, the sixth hole formed between the second hole and the fourth hole; a seventh hole defined through the dielectric layers and into the cavity, the seventh hole formed between the first hole and the fourth hole; an eighth hole defined through the dielectric layers and into the cavity, the eighth hole formed between the second hole and the third hole.

EXAMPLE 28 includes the subject matter of Example 27, wherein a center of the fifth hole is aligned with a center of the optical circuit element and a center of the sixth hole, a center of the seventh hole is aligned with a center of the optical circuit element and a center of the eighth hole.

EXAMPLE 29 includes the subject matter of any one of Examples 26-28, wherein the optical element is centrally located between the first hole, the second hole, the third hole, and the fourth hole.

EXAMPLE 30 includes the subject matter of any one of Examples 23-29, wherein the holes are rectangular.

EXAMPLE 31 includes the subject matter of any one of Examples 23-30, wherein the holes are square.

EXAMPLE 32 includes the subject matter of any one of Examples 23-31, wherein the cavity is not defined under the conductive pads.

EXAMPLE 33 includes the subject matter of any one of Examples 23-32, wherein the optical circuit element is a micro ring resonator (MRR) with a heater element.

In the above description, various aspects of the illustrative implementations have been described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations have been set forth to provide a thorough understanding of the illustrative implementations. However, it will be apparent to one skilled in the art that the present disclosure may be practiced without all of the specific details. In other instances, well-known features have been omitted or simplified in order not to obscure the illustrative implementations.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "over," "under," "between," "above," and "on" as used herein may refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening features.

The above description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact. Further, "adjacent" may refer to layers or components that are in physical contact with each other. That is, there is no layer or component between the stated adjacent layers or components. For example, a layer X that is adjacent to a layer Y refers to a layer that is in physical contact with layer Y.

In various embodiments, the phrase "a first feature formed, deposited, or otherwise disposed on a second feature" may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature. Further, "located on" in the context of a first layer or component located on a second layer or component may refer to the first layer or component being directly physically attached to the second part or component (no layers or components between the first and second layers or components) or physically attached to the second layer or component with one or more intervening layers or components.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

The invention claimed is:

1. An apparatus comprising:
- a substrate;
- one or more dielectric layers on the substrate;
- a first conductive pad on the dielectric layers;
- a second conductive pad on the dielectric layers;
- an optical circuit element in one of the dielectric layers, the optical circuit element between the first conductive pad and the second conductive pad;
- a cavity defined within the substrate below the optical circuit element;
- a first hole defined through the dielectric layers and into the cavity, the first hole formed between the first conductive pad and the optical circuit element; and
- a second hole defined through the dielectric layers and into the cavity, the second hole formed between the second conductive pad and the optical circuit element.

2. The apparatus of claim 1, wherein the optical element is centrally located between the first hole and the second hole.

3. The apparatus of claim 1, wherein a center of the first hole is aligned with a center of the first conductive pad and a center of the optical circuit element, and a center of the second hole is aligned with a center of the second conductive pad and a center of the optical circuit element.

4. The apparatus of claim 1, further comprising:
- a third conductive pad on the dielectric layers;
- a fourth conductive pad on the dielectric layers;
- a third hole defined through the dielectric layers and into the cavity, the third hole formed between the third conductive pad and the optical circuit element; and
- a fourth hole defined through the dielectric layers and into the cavity, the fourth hole formed between the fourth conductive pad and the optical circuit element.

5. The apparatus of claim 4, further comprising:
- a fifth hole defined through the dielectric layers and into the cavity, the fifth hole formed between the first hole and the third hole;

a sixth hole defined through the dielectric layers and into the cavity, the sixth hole formed between the second hole and the fourth hole;

a seventh hole defined through the dielectric layers and into the cavity, the seventh hole formed between the first hole and the fourth hole; and an eighth hole defined through the dielectric layers and into the cavity, the eighth hole formed between the second hole and the third hole.

6. The apparatus of claim 5, wherein a center of the fifth hole is aligned with a center of the optical circuit element and a center of the sixth hole, a center of the seventh hole is aligned with a center of the optical circuit element and a center of the eighth hole.

7. The apparatus of claim 4, wherein the optical element is centrally located between the first hole, the second hole, the third hole, and the fourth hole.

8. The apparatus of claim 1, wherein the cavity is not defined under the conductive pads.

9. The apparatus of claim 1, wherein the optical circuit element is a micro ring resonator (MRR) with a heater element.

10. A photonic integrated circuit (PIC) device, comprising:

conductive pads on a surface of the PIC;

a micro ring resonator (MRR) with a heater element, wherein the MRR is centrally located between the conductive pads;

a cavity defined within a substrate of the PIC below the MRR; and a plurality of holes defined between the MRR and the conductive pads, the plurality of holes extending from a top surface of the PIC into the cavity, each hole between a respective conductive pad and the MRR.

11. The PIC device of claim 10, wherein the MRR is centrally located between the plurality of holes.

12. The PIC device of claim 10, wherein a center of each hole of the plurality of holes is aligned with a center of its respective conductive pad and the optical circuit element.

13. The PIC device of claim 10, wherein the plurality of holes is a first set of holes and the PIC further comprises a second set of holes extending from the top surface of the PIC device into the cavity, each hole of the second set of holes formed between a pair of holes of the first set of holes.

14. The PIC device of claim 10, wherein the cavity is not defined under the conductive pads.

15. The PIC device of claim 10, further comprising conductive traces connecting the conductive pads to the optical circuit element.

16. The PIC device of claim 10, further comprising optical waveguides connected to the MRR, each optical waveguide between two of the plurality of holes.

17. An integrated circuit package comprising:

a package substrate;

an electronic integrated circuit (EIC); and a photonic integrated circuit (PIC) coupled to the EIC, wherein the PIC comprises:

conductive pads on a surface of the PIC;

a micro ring resonator (MRR) with a heater element, wherein the MRR is centrally located between the conductive pads;

a cavity defined within a substrate of the PIC below the MRR; and a plurality of holes defined between the MRR and the conductive pads, the plurality of holes extending from a top surface of the PIC into the cavity, each hole between a respective conductive pad and the MRR.

18. The integrated circuit package of claim 17, wherein the EIC and PIC are coupled via bridge circuitry in the package substrate.

19. The integrated circuit package of claim 17, wherein the EIC and PIC are directly coupled.

20. The integrated circuit package of claim 17, wherein the PIC is embedded within a cavity of the package substrate.

* * * * *